US010016654B2

United States Patent
Park

(10) Patent No.: US 10,016,654 B2
(45) Date of Patent: Jul. 10, 2018

(54) METHOD FOR SYNCHRONIZING DATA COLLECTED FROM A CAMERA DEVICE AND A MOTION SENSING DEVICE AND DATA PROCESSING DEVICE GENERATING THE SYNCHRONIZED DATA

(71) Applicant: GOLFZON Co., Ltd., Daejeon (KR)

(72) Inventor: Hyun Jin Park, Daejeon (KR)

(73) Assignee: GOLFZON Co., Ltd., Daejeon (KR)

( * ) Notice: Subject to any disclaimer, the term of this patent is extended or adjusted under 35 U.S.C. 154(b) by 21 days.

(21) Appl. No.: 15/127,793

(22) PCT Filed: Mar. 20, 2015

(86) PCT No.: PCT/KR2015/002763
§ 371 (c)(1),
(2) Date: Sep. 21, 2016

(87) PCT Pub. No.: WO2015/142121
PCT Pub. Date: Sep. 24, 2015

(65) Prior Publication Data
US 2017/0117019 A1 Apr. 27, 2017

(30) Foreign Application Priority Data
Mar. 21, 2014 (KR) ........................ 10-2014-0033109

(51) Int. Cl.
*A63B 24/00* (2006.01)
*A63B 69/36* (2006.01)
(Continued)

(52) U.S. Cl.
CPC ...... *A63B 24/0003* (2013.01); *A63B 69/3608* (2013.01); *A63B 2220/05* (2013.01);
(Continued)

(58) Field of Classification Search
None
See application file for complete search history.

(56) References Cited

U.S. PATENT DOCUMENTS 7,602,301 B1 * 10/2009 Stirling ............... A61B 5/1127
340/573.1
2002/0114493 A1 * 8/2002 McNitt ............... A61B 5/1124
382/107

(Continued)

FOREIGN PATENT DOCUMENTS

| JP | 2005-513831 A | 5/2005 |
|---|---|---|
| KR | 10-2005-0087877 A | 8/2005 |
| KR | 10-2007-0107722 A | 11/2007 |

OTHER PUBLICATIONS

International Search Report for PCT/KR2015/002763 dated May 19, 2015 from Korean Intellectual Property Office.

*Primary Examiner* — Justin P Misleh
(74) *Attorney, Agent, or Firm* — Revolution IP, PLLC

(57) ABSTRACT

Provided is a method for synchronizing data between different types of devices for collecting and processing data with respect to a moving object, comprising: sampling first type data with respect to a motion of the object from one device; sampling second type data with respect to a motion of the object from another device having a larger sampling interval than the device; and generating data corresponding to a sampling time of the first type data by combining second type data respectively sampled before and after the sampling time of the first type data in a sampling interval of the second type data, to generate data synchronized with the sampling time of the first type data with respect to the second type data.

9 Claims, 15 Drawing Sheets

(51) Int. Cl.
    *G11B 27/10*         (2006.01)
    *G11B 27/031*      (2006.01)
    *G09B 19/00*       (2006.01)

(52) U.S. Cl.
    CPC ..... *A63B 2220/62* (2013.01); *A63B 2220/803* (2013.01); *A63B 2220/806* (2013.01); *G09B 19/0038* (2013.01); *G11B 27/031* (2013.01); *G11B 27/10* (2013.01)

(56) References Cited

U.S. PATENT DOCUMENTS

| | | | |
|---|---|---|---|
| 2002/0115046 A1* | 8/2002 | McNitt | A63B 24/0003 434/252 |
| 2002/0115047 A1* | 8/2002 | McNitt | A63B 24/0003 434/252 |
| 2003/0110297 A1 | 6/2003 | Tabatabai et al. | |
| 2004/0125133 A1 | 7/2004 | Pea et al. | |
| 2010/0238168 A1 | 9/2010 | Kim et al. | |
| 2011/0164044 A1 | 7/2011 | Huang | |
| 2011/0246509 A1 | 10/2011 | Migita et al. | |
| 2013/0064427 A1* | 3/2013 | Picard | G01S 5/163 382/103 |
| 2014/0046588 A1 | 2/2014 | Maezawa et al. | |

\* cited by examiner

Prior Art

Prior Art

METHOD FOR SYNCHRONIZING DATA COLLECTED FROM A CAMERA DEVICE AND A MOTION SENSING DEVICE AND DATA PROCESSING DEVICE GENERATING THE SYNCHRONIZED DATA

CROSS REFERENCE TO PRIOR APPLICATIONS

This application is a National Stage Application of PCT International Patent Application No. PCT/KR2015/002763 filed on Mar. 20, 2015, under 35 U.S.C. § 371, which claims priority to Korean Patent Application No. 10-2014-0033109 filed on Mar. 21, 2014, which are all hereby incorporated by reference in their entirety.

TECHNICAL FIELD

The present invention relates to a method for generating synchronized data with respect to data acquired by different types of devices, that is, heterogeneous devices, and a data processing device for generating synchronized data in order to solve a problem that data acquired by different types of devices with respect to the same object are not synchronized due to a data acquisition time difference between the devices.

BACKGROUND ART

Data regarding an object is acquired and analyzed to generate a result in many cases. For example, a motion sensor is attached to a moving object and data about a sensed motion of the moving object is acquired and analyzed to generate predetermined information about the motion of the object, or image data about the moving object is acquired and analyzed to create predetermined information about the motion of the object.

Acquisition of data regarding an object and generation of a result using the data are used for sports motion analysis and the like.

For example, there is a case in which predetermined data regarding a golf swing of a user is acquired and a result is generated using the data, as illustrated in FIG. 1.

Specifically, as shown in FIG. 1, it is possible to provide information about a golf swing motion of the user U and a motion of a golf club during golf swing to the user as an integrated result by photographing a golf swing of the user U with the golf club GC to acquire image data about the golf swing motion of the user, obtaining motion sensing data about the golf swing through a motion sensing device MSD attached to the golf club GC, and representing the motion of the golf club GC, acquired by the motion sensing device MSD, along with a golf swing motion image of the user.

Here, an image acquired by a camera device 10 is delivered to an image processing device 20, data acquired through the motion sensing device MSD is wirelessly transmitted to a motion sensing data processing device 30 and then delivered to the image processing device 20, and a predetermined image is generated from the image data and the motion sensing data in the image processing device 20 and displayed through a display device 40, as illustrated in FIG. 1.

Examples of images displayed through the aforementioned method are shown in FIG. 3. Here, there is a difference between an image data sampling rate and a motion sensing data sampling rate, and thus unnatural images are provided.

FIG. 2 shows sampling time of image data and motion sensing data which are sampled through the system as illustrated in FIG. 1. In this case, it is very difficult to use the image data and the motion sensing data as data about the same time due to a remarkable difference between a sampling rate of the camera device and a sampling rate of the motion sensing device.

In general, the motion sensing device including an acceleration sensor, a gyro sensor or the like acquires data hundreds or thousands of times per second, whereas the camera device acquires an image of scores of frames per second. Even a high-speed camera or super-high-speed camera acquires hundreds of frames per second. Accordingly, it is difficult to obtain data regarding the same time through the motion sensing device and the camera device due to a data acquisition time difference between the motion sensing device and the camera device.

As shown in FIG. 2, when the image data sampling time is T1, T2, T3, . . . , an image data sampling interval is $\Delta T$, the motion sensing data sampling time is t1, t2, t3, . . . and a motion sensing data sampling interval is $\Delta t$, very unnatural images are obtained as illustrated in FIG. 3 since there is a large difference between $\Delta T$ and $\Delta t$.

Images of a consecutive golf swing motion of the user are shown in (a) to (h) of FIG. 3. Here, an object SO overlapping each image is based on motion sensing data acquired by the motion sensing device attached to the golf club of the user.

In FIG. 3, (a) to (d) show identical image data sampled at a certain time and (e) to (h) show identical image data sampled at the next time. The objects SO according to the motion sensing data, shown in (a) to (h), are based on data sampled at different times.

That is, while the image data shown in FIG. 3(a) is acquired and then the image data shown in FIG. 3(e) is obtained, motion sensing data is obtained as illustrated in (a), (b), (c) and (d) of FIG. 3 and then motion sensing data is obtained as illustrated in (e), (f), (g) and (h) of FIG. 3.

When the still images shown in (a) to (h) of FIG. 3 are reproduced as a moving image, the images are not matched with the objects SO and thus an unnatural image is reproduced.

Although FIGS. 1 to 3 exemplify image data and motion sensing data, it is difficult to acquire synchronized data between different types of devices which acquire different types of data other than the image data and motion sensing data due to a sampling time difference between the devices. Accordingly, it is difficult to use data acquired by the respective devices for the same result in many cases.

For example, when images as shown in FIG. 3 are generated using image data regarding a golf swing of a user and motion sensing data acquired by a motion sensing device attached to the head of the user, an unnatural image, in which an object (e.g., an object indicating the head of the user using a circle) displayed based on the motion sensing data moves while the head of the user does not move, is generated.

DISCLOSURE

Technical Problem

To solve problems generated due to a data acquisition time difference between different types of devices which acquire predetermined data regarding an identical object, it is an object of the present invention to provide a method for synchronizing data between the different types of devices and a data processing device for generating synchronized data to generate synchronized data with respect to data acquired by the different types of devices so as to generate an integrated result using the generated synchronized data.

Technical Solution

A method for synchronizing data between different types of devices for collecting and processing data with respect to a moving object, according to an embodiment of the present invention, includes: sampling first type data with respect to a motion of the object from one device; sampling second type data with respect to a motion of the object from another device having a larger sampling interval than the device; and generating data corresponding to a sampling time of the first type data by combining second type data respectively sampled before and after the sampling time of the first type data in a sampling interval of the second type data, to generate data synchronized with the sampling time of the first type data with respect to the second type data.

A method for synchronizing data between a camera device for collecting image data with respect to a moving object and a motion sensing device for collecting motion sensing data with respect to the object, according to an embodiment of the present invention, includes: sampling image data with respect to the object from the camera device; sampling motion sensing data with respect to the object from the motion sensing device; and generating image data corresponding to a sampling time of the motion sensing data by composing image data respectively sampled before and after the sampling time of the motion sensing data in a sampling interval of the image data, to generate image data synchronized with the sampling time of the motion sensing data.

A data processing device for generating synchronized data between a camera device for collecting image data with respect to a moving object and a motion sensing device for collecting motion sensing data with respect to the object, according to an embodiment of the present invention, includes: a first sampler for sampling image data with respect to the object from the camera device; a second sampler for sampling motion sensing data with respect to the object from the motion sensing device; and a synchronizer for generating image data synchronized with a sampling time of the motion sensing data by composing image data respectively sampled before and after the sampling time of the motion sensing data in a sampling interval of the image data to generate image data corresponding to the sampling time of the motion sensing data.

A data processing device for generating synchronized images between image data having a relatively low sampling rate and motion sensing data having a relatively high sampling rate, according to an embodiment of the present invention, includes: a synchronizer for composing image data respectively sampled before and after a sampling time of the motion sensing data in a sampling interval of the image data to generate image data corresponding to the sampling time of the motion sensing data; and an image generator for generating an image based on the generated image data and including information based on the motion sensing data and displayed thereon.

Advantageous Effects

The method for synchronizing data between different types of devices and a data processing device for generating synchronized data according to the present invention can generate synchronized data with respect to data acquired by the devices which obtain predetermined data regarding the same identical object. Accordingly, the data acquired by the devices can be used when a result with respect to the object is generated, thereby enabling generation of a result having a greater value than a result obtained using only each piece of data.

DESCRIPTION OF DRAWINGS

The above and other objects, features and other advantages of the present invention will be more clearly understood from the following detailed description taken in conjunction with the accompanying drawings, in which.

BEST MODE

A method for synchronizing data between different types of devices and a data processing device for generating synchronized data according to the present invention will be described in detail with reference to the attached drawings.

The method for synchronizing data between different types of devices according to an embodiment of the present invention provides a method of generating an integrated result using different types of data acquired by the devices with respect to a moving object.

Figure 1:
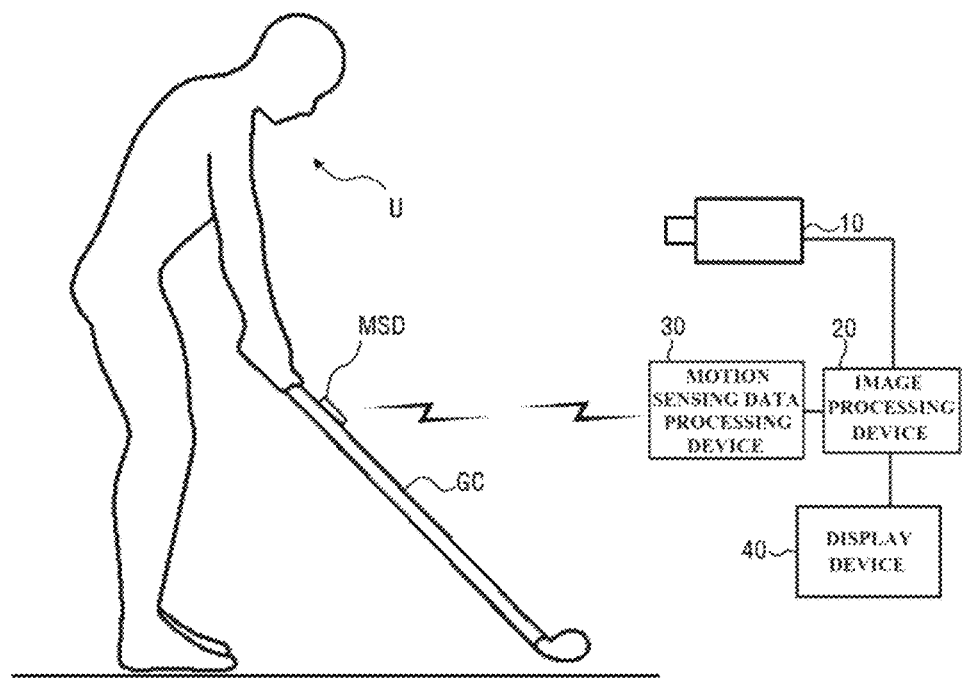
FIG. 1 is a view showing a configuration of an apparatus for generating a result using image data regarding a golf swing motion of a user and motion sensing data obtained by sensing a golf club motion during golf swing.
Figure 2:
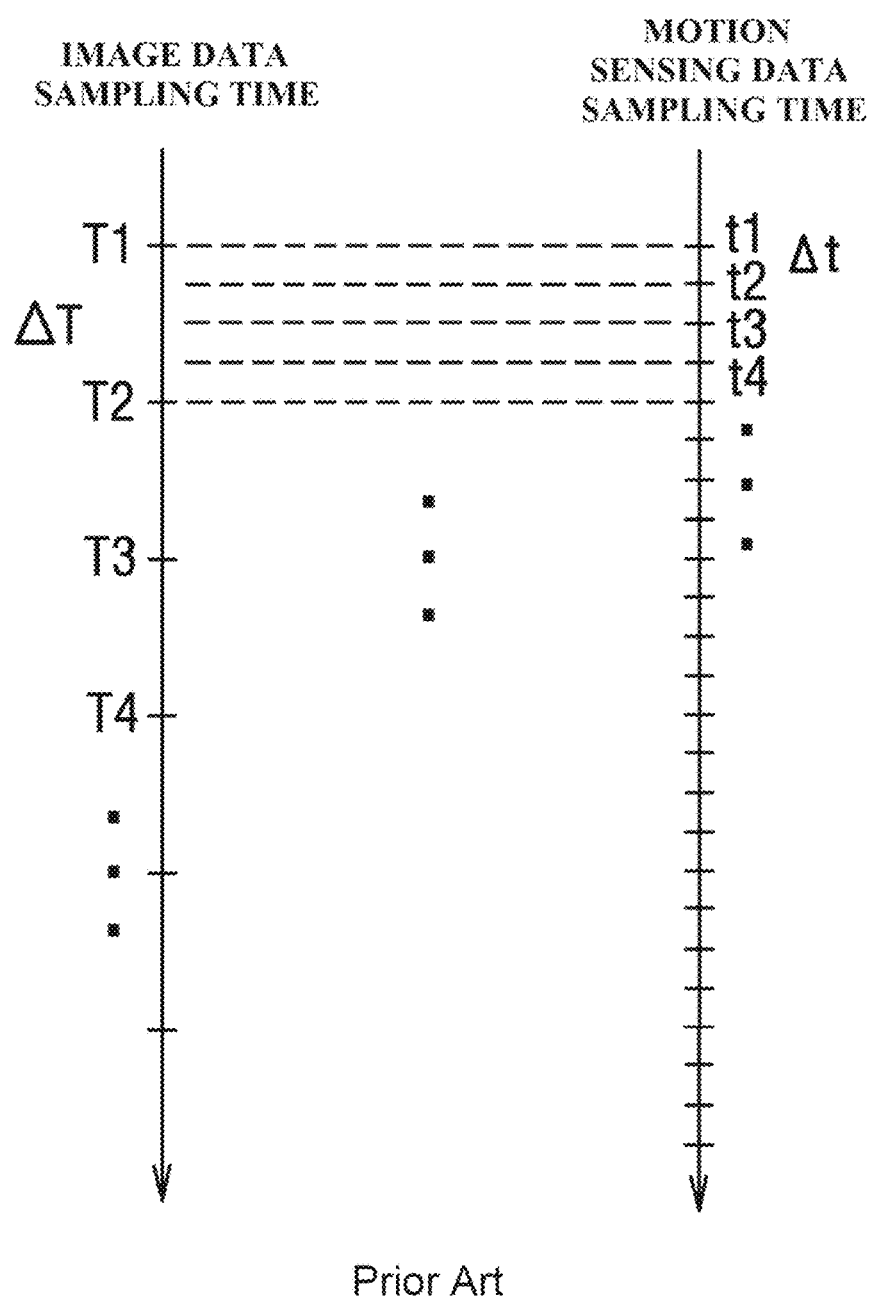
FIG. 2 is a view showing sampling time of the image data and motion sensing data acquired with respect to the golf swing motion of the user through the apparatus shown in FIG. 1.
Figure 3:
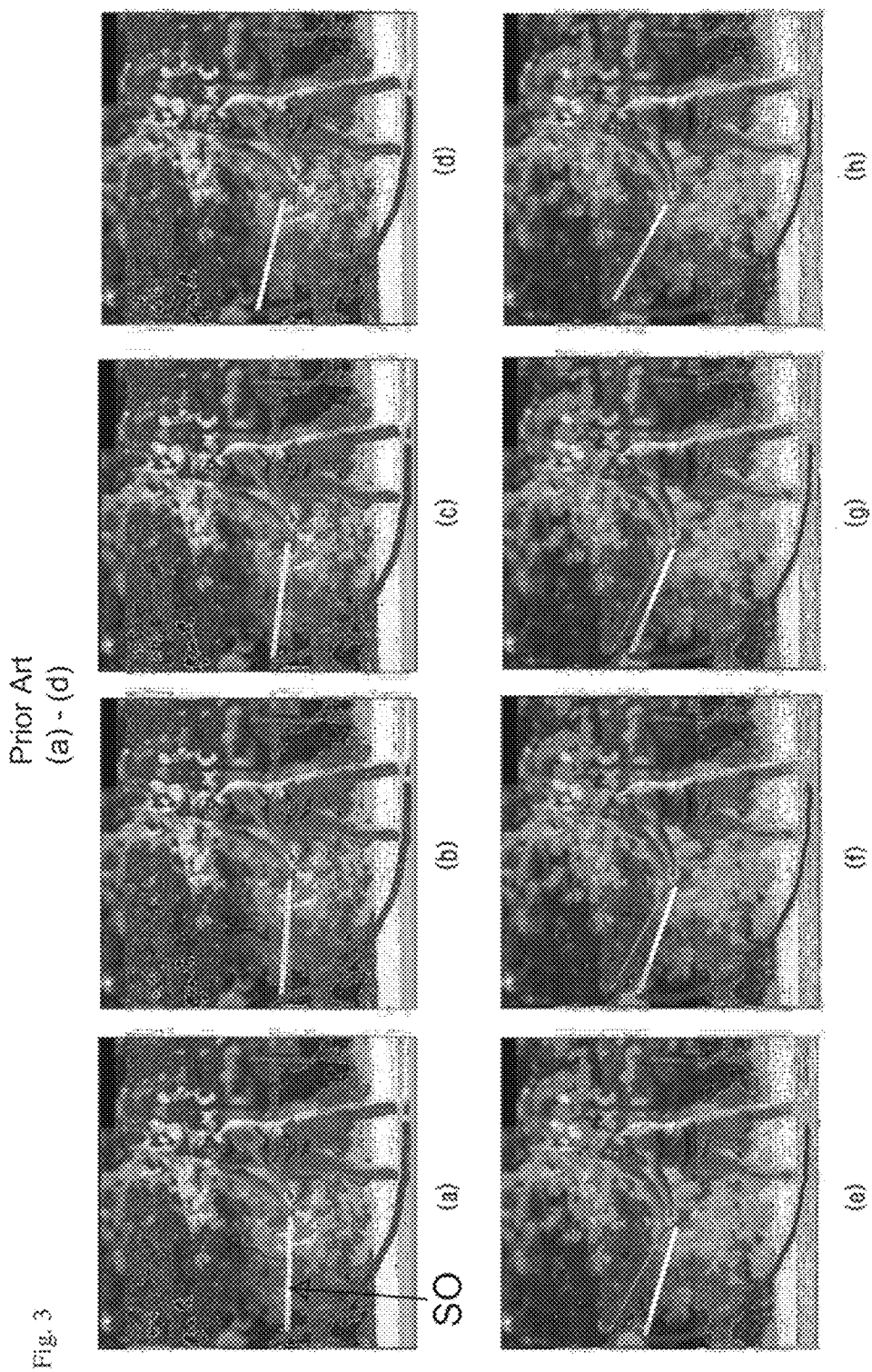
FIG. 3 is a view showing consecutive frames of an image created in such a manner that an object based on motion sensing data is displayed on image data, as a result generated according to the apparatus and the data sampling time shown in FIGS. 1 and 2.
Figure 4:
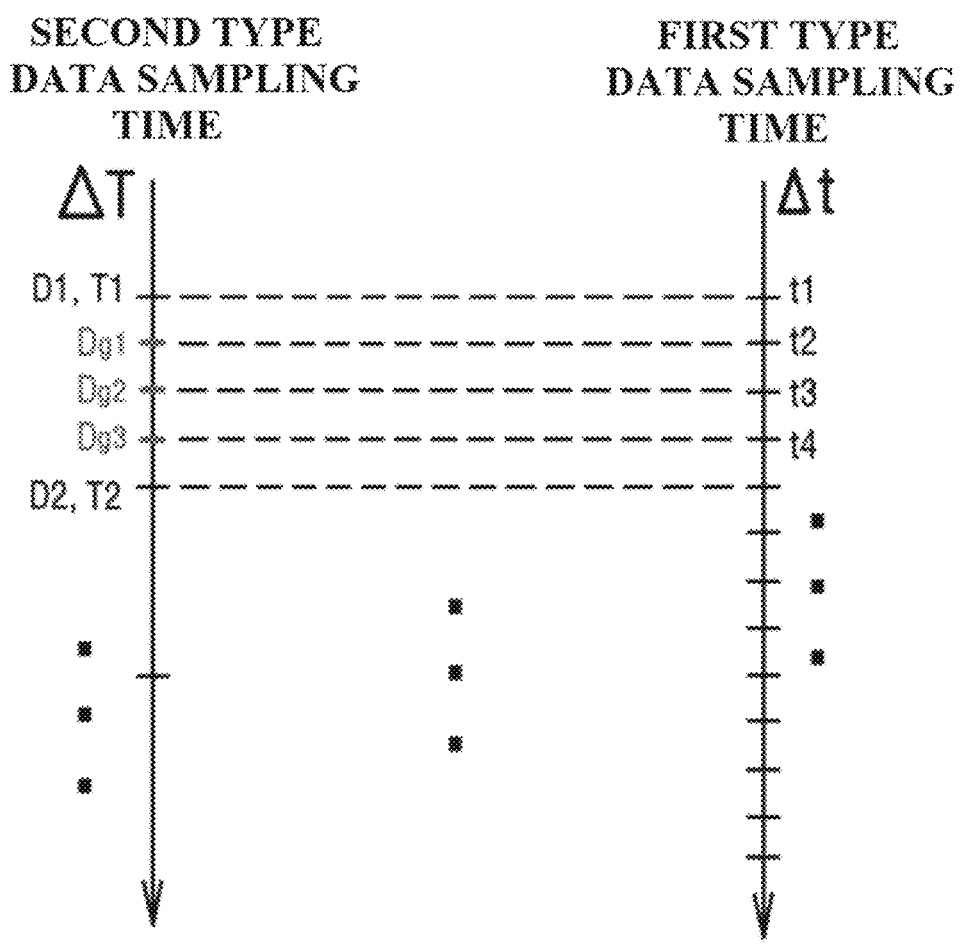
FIG. 4 is a view illustrating a method for synchronizing data between different types of device according to an embodiment of the present invention.

FIG. 4 is a view illustrating the method for synchronizing data between different types of devices according to an embodiment of the present invention and shows sampling time of first type data regarding motion of an object, acquired by one device, and sampling time of second type data regarding the motion of the object, acquired by the other device.

Here, the first type data and the second type data are different types of data with respect to the object and, for example, may be image data and motion sensing data or different types of motion sensing data.

Referring to FIG. 4, since the sampling interval Δt of the first type data is shorter than the sampling interval ΔT of the second type data, the number of pieces of first type data sampled per unit time is greater than the number of pieces of second type data sampled per unit time. That is, a sampling rate of the first type data is higher than that of the second type data.

For example, even if time t1 of the first type data is synchronized with type T1 of the second type data, as shown in FIG. 4, synchronized data is barely present after the time t1 and the time T1 since the first type data and the second type data have different sampling rates. Accordingly, it is different to generate a result using the two types of data.

With respect to data having different sampling rates as illustrated in FIG. 4, the method for synchronizing data between different types of devices according to an embodiment of the present invention generates data, which are synchronized with the sampling time of the first type data on the basis of the first type data, for the second type data.

That is, when the second type data includes data D1 sampled at time T1 and data D2 sampled at time T2, as shown in FIG. 4, data Dg1, data Dg2 and data Db3 respectively corresponding to sampling times t2, t3 and t4 of the first type data are generated through synchronization so as to generate data synchronized with the first type data with respect to the second type data.

More specifically, the data Dg1, Dg2 and Dg3 shown in FIG. 4 are respectively synchronized with sampling times t2, t3 and t4 of the first type data. The data Dg1, Dg2 and Dg3 may be generated by combining data D1 and D2 respectively acquired at sampling times T1 and T2 of the second type data, which are closest to the sampling times t2, t3 and t4 of the first type data, according to predetermined conditions.

Here, "combination" may depend on data type. For example, when the first type data are motion sensing data regarding a motion of an object and the second type data are image data regarding the object, "combination" may mean composing the image data according to predetermined conditions, summing the data D1 corresponding to T1 and the data D2 corresponding to T2 according to predetermined conditions, or deriving a value obtained by applying D1 and D2 to a predetermined function.

Here, it may be possible to combine D1 and D2 by respectively applying weights to D1 and D2 depending on time. For example, the data Dg1 corresponding to the time t2 may be generated by assigning weights, which increase as D1 and D2 approach the time 2, to D1 and D2 and then combining the weighted D1 and D2.

For example, the data Dg1 can be generated by calculating a first weight W1 to be applied to D1 as $(T2-t2)/\Delta T$, calculating a second weight to be applied to D2 as $(t2-T1)/\Delta T$ and combining W1*D1 and W2*D2.

Similarly, the data Dg2 can be generated by combining $\{(T2-t3)/\Delta T\}*D1$ and $\{(t3-T1)/\Delta T\}*D2$ and the data Dg3 can be generated by combining $\{(T2-t4)/\Delta T\}*D1$ and $\{(t4-T1)/\Delta T\}*D2$.

A data processing device for generating synchronized data according to an embodiment of the present invention will be described with reference to FIG. 5.

Figure 5:
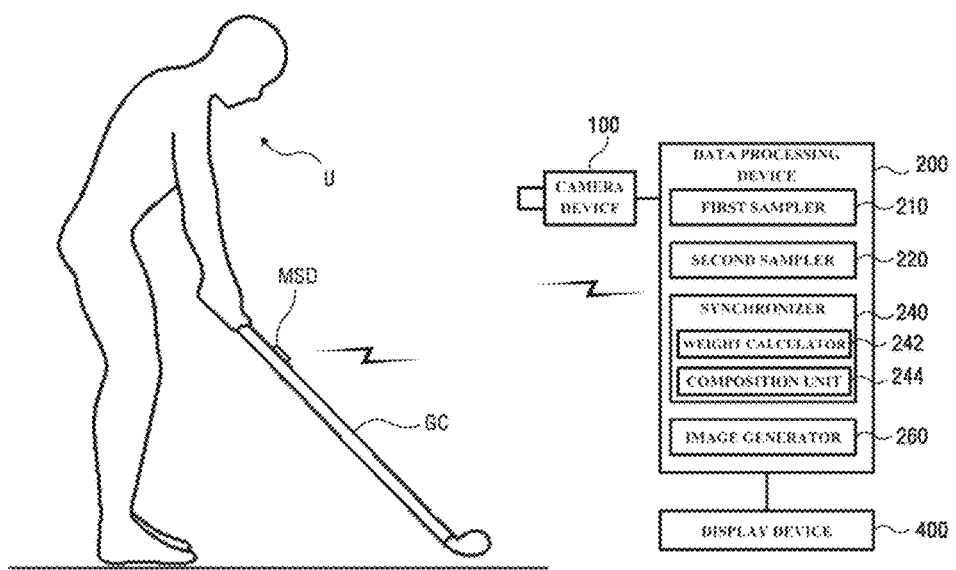
FIG. 5 is a view illustrating a configuration of a data processing device for generating synchronized data according to an embodiment of the present invention.

FIG. 5 is a block diagram of a data processing device for generating a result using image data with respect to a golf swing motion of a user U with a golf club GC and motion sensing data regarding the golf club. Referring to FIG. 5, the data processing device 200 according to an embodiment of the present invention may be connected with a camera device 100 and a display device 400, a motion sensing device MSD is attached to the golf club GC held by the user U and the data processing device 200 wirelessly receives data acquired by the motion sensing device MSD and processes the received data.

The data processing device 200 according to an embodiment of the present invention may include a first sampler 210, a second sampler 220, a synchronizer 240 and an image generator 260.

The first sampler 210 samples image data about the user who is performing golf swing, acquired from the camera device 100, and the second sampler samples motion sensing data about the golf club GC moving according to golf swing of the user U, acquired by the motion sensing device MSD.

The synchronizer 240 generates image data synchronized with motion sensing data having a high sampling rate. The synchronizer 240 generates synchronized image data by applying predetermined weights to image data sampled before and after a motion sensing data sampling time and combining the weighted image data.

More specifically, the synchronizer 240 includes a weight calculator 242 and a composing unit 244.

The weight calculator 242 is configured to calculate a weight, which increases as image data corresponding thereto is closer to a motion sensing data sampling time, for the image data. The weight calculator 242 respectively calculates weights for image data sampled before and after the motion sensing data sampling time.

The composing unit 244 respectively applies the calculated weights to the image data sampled before and after the motion sensing data sampling time and composes the weighted image data to generate image data corresponding to the motion sensing data sampling time.

The image generator 260 generates an image by overlapping an image corresponding to the generated image data synchronized with the motion sensing data sampling time and an image generated based on the motion sensing data.

The synchronized image generated by the image generator 260 is reproduced through the display device 400 and provided to the user.

Figure 6:
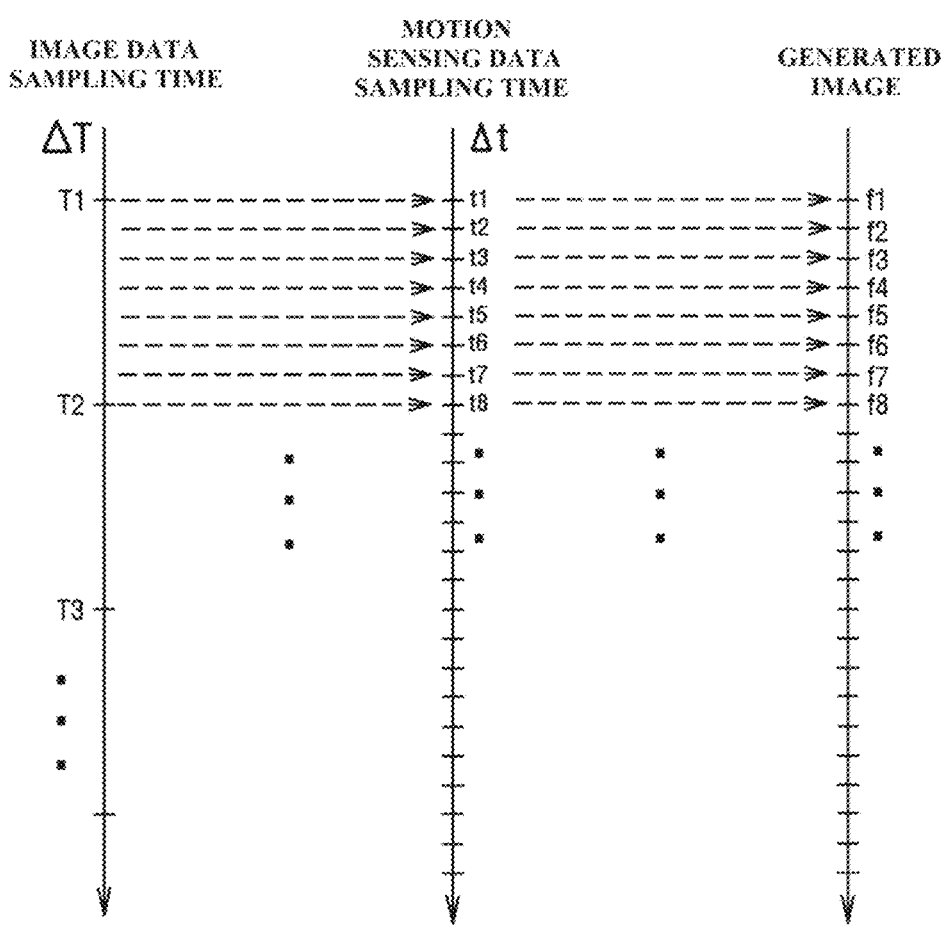
FIG. 6 is a view illustrating an example of information with respect to sampling time of data acquired through the configuration shown in FIG. 5.
Figure 7:
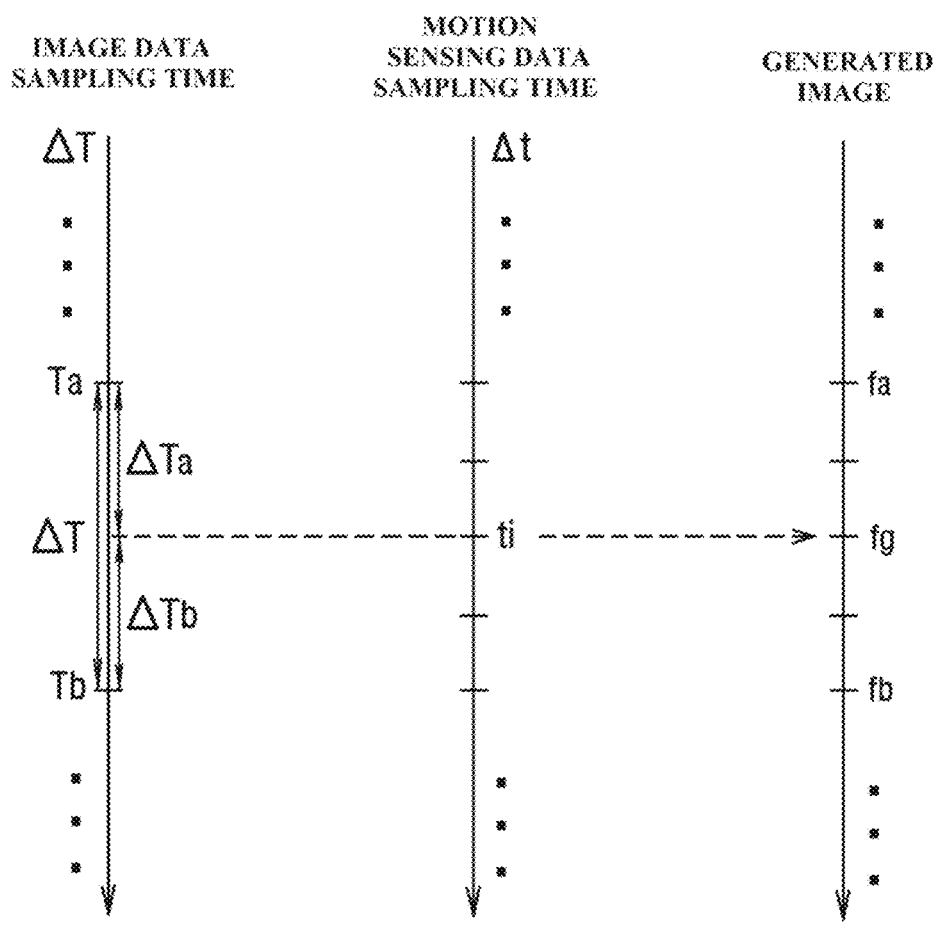
FIG. 7 is a view illustrating a principle of calculating weights for generating synchronized images corresponding to motion sensing data sampling time on the basis of the motion sensing data sampling time.

An example of information with respect to sampling times of data acquired by the aforementioned configuration is shown in FIG. 6 and examples of images generated corresponding to the sampling times are shown in FIGS. 8 to 15. FIG. 7 is a view for explaining a principle of weight calculation by the weight calculator.

Referring to FIG. 6, image data acquired through the camera device 100 and motion sensing data acquired through the motion sensing device MSD in the configuration shown in FIG. 5 are sampled at different sampling intervals. Here, 8 motion sensing data are sampled while one frame of image data is sampled.

It is assumed that time T1 is synchronized with time t1 and time T2 is synchronized with time t8, as shown in FIG. 6, for convenience of description.

An object of the data processing device according to an embodiment of the present invention is to generate image data synchronized with times t2 to t7 between the time T1 and time T2.

The image data synchronized with t2 to t7 may be generated by combining, that is, composing, image data acquired at T1 and image data acquired at T2. To compose the image data, weights are calculated and applied to the image data.

A description will be given of a process of calculating weights when image data corresponding to a motion sensing data sampling time ti between a sampling time Ta and a sampling time Tb of the image data (the interval between Ta and Tb is referred to as ΔT) with reference to FIG. 7.

When the interval between Ta and ti is ΔTa and the interval between Tb and ti is ΔTb, ΔTa and ΔTb may be calculated as follows.

$$\Delta Ta = ti - Ta$$

$$\Delta Tb = Tb - ti$$

Image data acquired at Ta is denoted by fa, a pixel value of the image data fa is denoted by Pa[Ra,Ga,Ba], image data acquired at Tb is denoted by fb and a pixel value of the image data fb is denoted by Pb[Rb,Gb,Bb]. When a weight to be applied to the image data fa is Wa and a weight to be applied to the image data fb is Wb, Wa and Wb may be calculated as follows.

$$Wa = \Delta Tb / \Delta T$$

$$Wb = \Delta Ta / \Delta T$$

When synchronized image data corresponding to ti is fg and a pixel value thereof is Pg[Rg,Gg,Bg], Pg[Rg,Gg,Bg] may be calculated as follows.

$$Pg[Rg,Gg,Bg] = Pa[Wa*Ra, Wa*Ga, Wa*Ba] + Pb[Wb*Rb, Wb*Gb, Wb*Bb]$$

That is, the weight Wa is applied to values of all pixels of the image data fa, the weight Wb is applied to values of all pixels of the image data fb, and pixel values to which the weight Wa has been applied and pixel values respectively corresponding to the pixel values and weighted by Wb are summed to generate composite image data having the summed pixel values, thereby generating image data corresponding to the time ti.

Figure 8:
FIGS. 8 to 15 are views illustrating examples of image data with respect to a golf swing motion of a user, which includes synchronized images according to an embodiment of the present invention.

In this manner, images shown in FIGS. 8 to 15 may be obtained by representing images based on image data generated corresponding to t2 to t7 using image data acquired at T1 and T2, as shown in FIG. 6, along with an object SO generated based on motion sensing data acquired at t1 to t8 and overlapping the images (SO denoting the object is shown only in FIG. 8 and omitted in FIGS. 9 to 15).

FIG. 8 shows an image corresponding to the image data acquired at T1 and having an object generated based on motion sensing data acquired at t1 and displayed thereon.

Figure 15:

FIG. 15 shows an image corresponding to the image data acquired at T2 and having an object generated based on motion sensing data acquired at t8 and displayed thereon.

Figure 9:
Figure 10:
Figure 11:
Figure 12:
Figure 13:
Figure 14:

FIG. 9 shows an image generated to be synchronized with t2, FIG. 10 shows an image generated to be synchronized with t3, FIG. 11 shows an image generated to be synchronized with t4, FIG. 12 shows an image generated to be synchronized with t5, FIG. 13 shows an image generated to be synchronized with t6 and FIG. 14 shows an image generated to be synchronized with t7.

The images shown in FIGS. 9 to 14 are generated by applying weights calculated according to the principle illustrated in FIG. 7 to the image data corresponding to the images shown in FIGS. 8 and 15 and composing the image data.

Referring to FIG. 9, the image data (referred to as image data f1) corresponding to T1 and the image data (referred to as image data f2) corresponding to T2 are composed to generate the image. Here, it can be confirmed that the image data f1 is represented more clearly and the image data f2 is represented less clearly.

It can be confirmed that the image data f1 becomes less clear and the image data f2 becomes clearer in the images shown in FIGS. 9 to 14.

FIGS. 8 to 15 show still images and thus it is difficult to recognize effects of synchronized images therefrom. However, if the still images are continuously reproduced to be displayed as a moving image, the images are viewed as if the image data respectively acquired at t1 to t8 are continuously reproduced due to persistence of vision (the optical illusion whereby multiple discrete images blend into a single image in the human mind).

That is, when synchronized images are generated and reproduced according to the present invention, even if the images are acquired using a middle speed camera, for example, it is possible to obtain the same effect as reproduction of images acquired using a super-high speed camera (that is, even when a camera which acquires an image of 50 frames per second is used, effects of acquiring and reproducing an image of hundreds of frames per second are achieved by generating images synchronized with motion sensing data sampling times according to the present invention).

Generation of synchronized data according to the present invention is not limited to image data and motion sensing data as described above and is applied in various manners.

For example, when a sports motion of a user, such as a golf swing motion is analyzed, data acquired by a motion tracking device attached to the body of the user may be synchronized with data acquired by a motion sensing device attached to a golf club gripped by the user. If a sampling rate of the motion sensing device is higher than that of the motion tracking device, data, obtained by calculating weights according to the principle illustrated in FIG. 7, respectively applying the weights to sampled motion tracking data, and summing the weighted data or applying the data to a predetermined function, may be generated as data synchronized with motion sensing data. A result such as creation of accurate analysis information with respect to the golf swing motion of the user can be generated using the motion tracking data and motion sensing data generated as above.

As described above, according to the method for synchronizing data between different types of devices and the data processing device for generating synchronized data according to the present invention, synchronized data can be generated with respect to data acquired by the devices. Accordingly, when a result is generated, data acquired by the different types of devices can be used.

Therefore, it is possible to generate a result having a greater value than that obtained when only data acquired by each device are used.

MODE FOR INVENTION

Various embodiments for carrying out the invention have been described in the best mode for carrying out the invention.

INDUSTRIAL APPLICABILITY

The method for synchronizing data between different types of devices and the data processing device for generating synchronized data according to the present invention can generate synchronized data with respect to data acquired by the different types of devices, that is, heterogeneous devices to solve a problem that data acquired by different types of devices with respect to the same object are not synchronized due to a data acquisition time difference between the devices and thus can be available in industrial fields associated with information provision through processing and analysis of digital information.

The invention claimed is:

1. A method for synchronizing data between a camera device for collecting image data with respect to a moving object and a motion sensing device for collecting motion sensing data with respect to the moving object, comprising:
sampling the image data with respect to the moving object from the camera device;
sampling the motion sensing data with respect to the moving object from the motion sensing device; and
generating synchronized image data corresponding to a sampling time of the motion sensing data by composing the sampled image data respectively sampled before and after the sampling time of the motion sensing data in a sampling interval of the image data, wherein the synchronized image data is synchronized with the sampling time of the motion sensing data, the synchronized image data generated by:
calculating weights for the sampled image data, the weights increasing as the sampled image data approaches the sampling time of the motion sensing data;
respectively applying the calculated weights to the sampled image data respectively sampled before and after the sampling time of the motion sensing data; and
composing the weights applied image data to generate the synchronized image data corresponding to the sampling time of the motion sensing data.

2. The method according to claim 1, wherein the generating of the synchronized image data comprises generating image data synchronized with the sampling time of the motion sensing data by applying weights, calculated on the basis of sampling times of two image data close to the sampling time of the motion sensing data and a sampling interval of the motion sensing data, to the image data and composing the image data.

3. The method according to claim 1, wherein the generating of the synchronized image data comprises:
calculating a ratio of an interval between the sampling time of the motion sensing data and a sampling time of first image data corresponding to image data before the motion sensing data sampling time to the sampling interval of the image data as a second weight;
calculating a ratio of an interval between the sampling time of the motion sensing data and a sampling time of second image data corresponding to image data after the motion sensing data sampling time to the sampling interval of the image data as a first weight; and
applying the first weight to the first image data, applying the second weight to the second image data and composing the first image data and the second image data to which the first and second weights have been respectively applied.

4. The method according to claim 3, wherein the composing of the image data comprising:
applying the first weight to values of all pixels of the first image data and applying the second weight to values of all pixels of the second image data; and
summing pixel values to which the first weight has been applied and pixel values respectively corresponding to the pixel values and weighted by the second weight, to generate composite image data having the summed pixel value.

5. The method according to claim 1, further comprising generating images based on the image data synchronized with the motion sensing data sampling time and including an image generated based on the motion sensing data and displayed thereon.

6. A data processing device for generating synchronized data between a camera device for collecting image data with respect to a moving object and a motion sensing device for collecting motion sensing data with respect to the moving object, the data processing device generating the synchronized data according to the method of claim 1.

7. The data processing device according to claim 6, wherein the data processing device is further configured to calculate a ratio of an interval between the sampling time of the motion sensing data and a sampling time of first image data corresponding to image data before the motion sensing data sampling time to the sampling interval of the image data as a second weight and to calculate a ratio of an interval between the sampling time of the motion sensing data and a sampling time of second image data corresponding to image data after the motion sensing data sampling time to the sampling interval of the image data as a first weight.

8. The data processing device according to claim 7, wherein the data processing device is further configured to apply the first weight to values of all pixels of the first image data, to apply the second weight to values of all pixels of the second image data and to sum pixel values to which the first weight has been applied and pixel values respectively corresponding to the pixel values and weighted by the second weight, to generate composite image data having the summed pixel value.

9. The data processing device according to claim 6, wherein the data processing device is further configured to generate images based on the image data synchronized with the motion sensing data sampling time and including an image generated based on the motion sensing data and displayed thereon.

* * * * *